US011141815B2

(12) United States Patent
Dallarosa et al.

(10) Patent No.: US 11,141,815 B2
(45) Date of Patent: Oct. 12, 2021

(54) LASER PROCESSING SYSTEMS CAPABLE OF DITHERING (71) Applicant: IPG Photonics Corporation, Oxford, MA (US)

(72) Inventors: Joseph Leo Dallarosa, Uxbridge, MA (US); Ben Amar, Worcester, MA (US); David Squires, Lebanon, CT (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 242 days.

(21) Appl. No.: 15/024,177

(22) PCT Filed: Sep. 24, 2014

(86) PCT No.: PCT/US2014/057186
§ 371 (c)(1),
(2) Date: Apr. 21, 2016

(87) PCT Pub. No.: WO2015/048111
PCT Pub. Date: Apr. 2, 2015

(65) Prior Publication Data
US 2016/0228988 A1 Aug. 11, 2016

Related U.S. Application Data (60) Provisional application No. 61/881,666, filed on Sep. 24, 2013.

(51) Int. Cl.
*B23K 26/073* (2006.01)
*B23K 26/0622* (2014.01)
(Continued)

(52) U.S. Cl.
CPC .......... *B23K 26/073* (2013.01); *B23K 26/046* (2013.01); *B23K 26/048* (2013.01);
(Continued)

(58) Field of Classification Search
CPC .............. B23K 26/0622; B23K 26/073; B23K 26/0869; B23K 26/144; B23K 26/04;
(Continued)

(56) References Cited

U.S. PATENT DOCUMENTS 4,328,410 A 5/1982 Slivinsky et al.
4,368,080 A * 1/1983 Langen ................. B08B 7/0042
134/1
(Continued)

FOREIGN PATENT DOCUMENTS

EP 1640110 A1 3/2006
EP 2805790 A1 11/2014
(Continued)

OTHER PUBLICATIONS

PCT International Search Report and Written Opinion dated Feb. 6, 2015, received in corresponding PCT Application No. PCT/US.
(Continued)

*Primary Examiner* — Erin E McGrath
(74) *Attorney, Agent, or Firm* — Grossman, Tucker, Perrault & Pfleger, PLLC (57) ABSTRACT Laser processing systems and methods are capable of moving a laser beam while maintaining consistent laser beam characteristics at processing locations. The laser processing systems generate a collimated laser beam having a consistent Z axis power density along at least a portion of a length of the laser beam and dither the collimated laser beam along one of the X and Y axes. The dithering of the collimated laser beam facilitates consistent laser processing on a three-dimensional surface, for example, to provide consistent deposition of a coating in a laser cladding process. A laser processing system may include a beam delivery system that provides both the collimation and the dithering of the
(Continued)

collimated laser as well as an adjustment of the beam diameter of the collimated beam.

20 Claims, 12 Drawing Sheets (51) Int. Cl.
| | |
|---|---|
| *B23K 26/046* | (2014.01) |
| *B23K 26/21* | (2014.01) |
| *B23K 26/32* | (2014.01) |
| *B23K 26/08* | (2014.01) |
| *B23K 26/04* | (2014.01) |
| *B23K 26/14* | (2014.01) |
| *B23K 26/144* | (2014.01) |
| *B23K 26/34* | (2014.01) |
| *B23K 26/12* | (2014.01) |
| *B23K 26/364* | (2014.01) |
| *B23K 26/06* | (2014.01) |
| *B23K 101/00* | (2006.01) |
| *B23K 103/08* | (2006.01) |
| *F01D 5/28* | (2006.01) |

(52) U.S. Cl.
CPC ...... *B23K 26/0622* (2015.10); *B23K 26/0648* (2013.01); *B23K 26/0861* (2013.01); *B23K 26/0869* (2013.01); *B23K 26/127* (2013.01); *B23K 26/144* (2015.10); *B23K 26/147* (2013.01); *B23K 26/21* (2015.10); *B23K 26/32* (2013.01); *B23K 26/34* (2013.01); *B23K 26/364* (2015.10); *B23K 2101/001* (2018.08); *B23K 2103/08* (2018.08); *F01D 5/288* (2013.01); *F05D 2230/31* (2013.01); *F05D 2230/90* (2013.01)

(58) Field of Classification Search
CPC .. B23K 26/042; B23K 26/043; B23K 26/082; B23K 26/0876; B23K 26/0892; B23K 2101/001
USPC .............. 219/121.78–121.81, 121.6, 121.64, 219/121.66, 121.69, 121.72, 121.85
See application file for complete search history.

(56) References Cited

U.S. PATENT DOCUMENTS

| | | | | |
|---|---|---|---|---|
| 4,644,127 A | * | 2/1987 | La Rocca | ............ B23K 26/144 219/121.64 |
| 4,670,638 A | | 6/1987 | Pavlin | |
| 5,160,822 A | * | 11/1992 | Aleshin | ..................... F01D 5/20 219/121.64 |
| 5,571,430 A | | 11/1996 | Kawasaki et al. | |
| 6,269,540 B1 | * | 8/2001 | Islam | ................. B23K 26/0604 29/402.18 |
| 6,615,470 B2 | | 9/2003 | Corderman et al. | |
| 6,706,999 B1 | * | 3/2004 | Barrett | ................... B23K 26/02 219/121.74 |
| 6,838,638 B2 | | 1/2005 | Satou et al. | |
| 8,097,825 B2 | | 1/2012 | Sato et al. | |
| 2002/0017509 A1 | * | 2/2002 | Ishide | ................ B23K 26/0604 219/121.63 |
| 2002/0157249 A1 | | 10/2002 | Kim et al. | |
| 2003/0213787 A1 | * | 11/2003 | Dunsky | .............. B23K 26/0732 219/121.75 |
| 2005/0127049 A1 | * | 6/2005 | Woeste | .................. B23K 26/04 219/121.61 |
| 2005/0157762 A1 | * | 7/2005 | DeMaria | ............ B23K 26/0732 372/9 |
| 2006/0153996 A1 | * | 7/2006 | Stanek | .................... B23K 26/34 427/596 |
| 2008/0308538 A1 | | 12/2008 | Harris et al. | |
| 2008/0316586 A1 | * | 12/2008 | Maryfield | ............ G02B 26/101 359/318 |
| 2009/0107968 A1 | | 4/2009 | Bayer et al. | |
| 2009/0122391 A1 | | 5/2009 | Maryfield et al. | |
| 2009/0294419 A1 | * | 12/2009 | Abramov | ........... B23K 26/0736 219/121.68 |
| 2011/0089150 A1 | | 4/2011 | Arjakine et al. | |
| 2011/0284510 A1 | | 11/2011 | Reeves-Hall et al. | |
| 2012/0000611 A1 | * | 1/2012 | Lee | .................... B23K 26/0063 156/380.9 |
| 2012/0199564 A1 | | 8/2012 | Washko, Jr. et al. | |
| 2012/0273472 A1 | | 11/2012 | Unrath et al. | |
| 2013/0301042 A1 | | 11/2013 | Urano et al. | |

FOREIGN PATENT DOCUMENTS

| | | |
|---|---|---|
| JP | H04167986 A | 6/1992 |
| JP | 2003048095 A | 2/2003 |
| JP | 2003071583 A | 3/2003 |
| JP | 2005021908 A | 1/2005 |
| JP | 2010099731 A | 5/2010 |
| JP | 2011083822 A | 4/2011 |
| JP | 2011173146 A | 9/2011 |
| JP | 2012137350 A | 7/2012 |
| JP | 2013146752 A | 8/2013 |
| WO | 2013061085 A1 | 5/2013 |
| WO | 2013061086 A1 | 5/2013 |

OTHER PUBLICATIONS

Japanese Patent Office, Decision of Rejection relating to corresponding Japanese Patent Application No. 2016-516556, dated Feb. 25, 2019.

* cited by examiner

LASER PROCESSING SYSTEMS CAPABLE OF DITHERING

BACKGROUND OF THE DISCLOSURE

Field of the Disclosure

The present invention relates to laser processing and more particularly, to laser processing systems and methods capable of dithering a laser beam while maintaining consistent laser beam characteristics at processing locations, for example, on a three-dimensional surface of a workpiece.

Background Art Discussion

Lasers are commonly used for processing of substrates or base materials (hereinafter referred to as workpieces) with a variety of different techniques. One example of laser processing is a laser cladding process that uses the laser to heat the workpiece sufficiently to allow another material to adhere to a surface the workpiece, thereby depositing a coating on the surface of the workpiece. One type of laser cladding process entrains powder particles in a fast flowing stream of gas and allows the particles to impinge on the workpiece in the region heated by the laser such that the particles adhere to the workpiece through plastic deformation and bonding. Examples of laser cladding processes are described in greater detail in International Patent Application Publication Nos. WO2013/061085 and WO2013/061086, which are fully incorporated herein by reference. Other examples of laser processing include laser welding and laser material removal or cleaning.

One of the challenges in laser processing is the difficulty of moving the laser beam in a way that facilitates processing of more complex surfaces (e.g., three-dimensional surfaces) on workpieces while maintaining the desired characteristics of the laser beam (e.g., power density). Existing laser processing systems do not allow the laser beam to be moved with the desired response time and directionality. Laser processing systems that move the entire laser head, for example, do not provide a relatively fast response time. Some existing laser cladding systems simply raster scan in one direction, which requires more time and may not be effective on complex three-dimensional surfaces such as turbine blades.

Moreover, existing laser processing systems often focus the beam such that the power density varies along the Z axis of the beam. In a focused beam, the power density may vary significantly at different locations along the length of the beam because the power density is inversely related to the squared radius of the beam spot. Thus, movement of the laser beam and/or processing three-dimensional surfaces may result in a significant change in laser beam characteristics, such as power density, at different processing locations on the workpiece, thereby adversely affecting the consistency of the laser processing. Although galvo scanners have been used to scan laser beams in laser cladding systems, the systems often do not allow the beam to maintain a consistent power density at the processing locations. In certain laser cladding processes, for example, the temperature profile provided by the laser beam ahead of the powder should be precisely controlled. A change in power density of the laser beam may change the temperature profile and prevent the coating from being deposited with the desired consistency.

Accordingly, there is a need for laser processing systems and methods capable of moving the laser beam while maintaining consistent laser beam characteristics at processing locations, for example, on a three-dimensional surface of a workpiece.

SUMMARY

Consistent with an embodiment, a method is provided for laser processing a workpiece. The method includes: generating a collimated laser beam having a consistent Z axis power density along at least a portion of a length of the collimated laser beam; directing the collimated laser beam toward a workpiece to form a beam spot on the workpiece; moving the workpiece such that the beam spot facilitates processing on the surface of the workpiece as the workpiece moves; and dithering the collimated laser beam along one of the X and Y axes such that the beam spot is dithered on the workpiece as the workpiece is moved.

Consistent with another embodiment, a laser processing system includes a fiber laser system and a beam delivery system optically coupled to a fiber laser output of the fiber laser system. The beam delivery system includes collimating lenses to produce a collimated laser beam, and at least one of the collimating lenses is movable in the Z axis to change a diameter of the collimated beam. The laser processing system also includes a mechanism for moving the fiber laser output relative to the collimating lenses to dither the collimated laser beam in one of the X and Y axes, a workpiece holder for supporting and moving a workpiece, and a motion control system for controlling motion of the workpiece holder and the mechanism for moving the fiber laser output relative to the collimating lenses.

Consistent with a further embodiment, an optical head includes a housing, a fiber laser connector for connecting a fiber laser output to the housing at one end of the housing, and a beam delivery system located in the housing and optically coupled to the fiber laser output. The beam delivery system includes first and second collimating lenses for providing a collimated laser beam and a final collimating lens for providing a final collimation of the collimated laser beam. At least one of the first and second lenses is movable in a Z axis to change a diameter of the collimated laser beam. The optical head also includes an optics X-Y stage located in the housing and supporting the collimating lenses for movement in X and Y axes.

Consistent with an embodiment, a laser cladding method is provided for depositing a cladding layer on a workpiece. The laser cladding method includes: generating a collimated laser beam having a consistent Z axis power density along at least a portion of a length of the collimated laser beam; directing the collimated laser beam toward a workpiece to provide a beam spot on the workpiece; directing a cladding material toward the workpiece such that the cladding material impinges the surface of the workpiece on a region heated by the beam spot; and moving the workpiece such that the cladding material forms a cladding layer on the surface of the workpiece as the workpiece moves.

Consistent with another embodiment, a laser cladding system includes a fiber laser system and a beam delivery system optically coupled to a fiber laser output of the fiber laser system. The beam delivery system includes collimating lenses to produce a collimated laser beam, and at least one of the collimating lenses is movable in the Z axis to change a diameter of the collimated beam. The laser cladding system also includes a mechanism for moving the fiber laser output relative to the collimating lenses to dither the collimated laser beam in one of the X and Y axes, a workpiece holder for supporting and moving a workpiece and a motion control system for controlling motion of the workpiece holder and the mechanism for moving the fiber laser output relative to the collimating lenses. The laser cladding system further includes a powder delivery system for delivering cladding powder to the workpiece such that the cladding powder impinges the surface of the workpiece on a region heated by the collimated laser beam.

Consistent with a further embodiment, an integrated laser cladding optical head includes a housing, a fiber laser connector for connecting a fiber laser output to the housing at one end of the housing, and a beam delivery system located in the housing and optically coupled to the fiber laser output. The beam delivery system includes first and second collimating lenses for providing a collimated laser beam and a final collimating lens for providing a final collimation of the collimated laser beam. At least one of the first and second lenses is movable in a Z axis to change a diameter of the collimated laser beam. The integrated laser cladding optical head also includes an optics X-Y stage located in the housing and supporting the collimating lenses for movement in X and Y axes. The integrated laser cladding optical head further includes a powder delivery system including a powder delivery nozzle mounted to the housing, for delivering cladding powder to the workpiece such that the cladding powder impinges the surface of the workpiece on a region heated by the collimated laser beam

BRIEF DESCRIPTION OF THE DRAWINGS

These and other features and advantages will be better understood by reading the following detailed description, taken together with the drawings wherein.

DETAILED DESCRIPTION

Laser processing systems and methods, consistent with embodiments described herein, are capable of moving a laser beam while maintaining consistent laser beam characteristics at processing locations. The laser processing systems generate a collimated laser beam having a consistent Z axis power density along at least a portion of a length of the laser beam and dither the collimated laser beam along one of the X and Y axes. The dithering of the collimated laser beam facilitates consistent laser processing on a three-dimensional surface, for example, to provide consistent deposition of a coating in a laser cladding process. A laser processing system may include a beam delivery system that provides both the collimation and the dithering of the collimated laser as well as an adjustment of the beam diameter of the collimated beam.

The laser processing systems and methods, consistent with embodiments described herein, may be used for a variety of applications and three-dimensional surfaces. Examples of laser processing applications include laser cladding, welding, cleaning, material removal, surface hardening, and machining (e.g., scribing, cutting or shaping). Examples of workpieces with three-dimensional surfaces that may be processed include, without limitation, turbine blades, valve seats, and pipes.

As used herein, "collimated laser beam" refers to a laser beam having a relatively low beam divergence (e.g., a 10 mm diameter beam with a divergence of less than or equal to 1 mRAd) so that the beam radius does not undergo significant changes within moderate propagation distances. A "collimated laser beam" does not require exact or perfect collimation with zero divergence. As used herein, "consistent Z axis power density" means a power per area of a laser beam, which does not vary more than ±6% along a Z axis of the laser beam in a working range of 300 mm. A "consistent Z axis power density" does not require a power density that is exactly the same along the Z axis of the beam. As used herein, "workpiece" refers to an object or objects being processed by a laser beam and may include multiple objects being processed together (e.g., by welding together). As used herein, a "three-dimensional surface" refers to a non-flat surface that extends in the X, Y and Z axes. As used herein, "dithering" refers to moving a laser beam back and forth a relatively short distance (e.g., ±10 mm or less) along one axis while the beam remains substantially perpendicular to the workpiece.

Figure 1A:
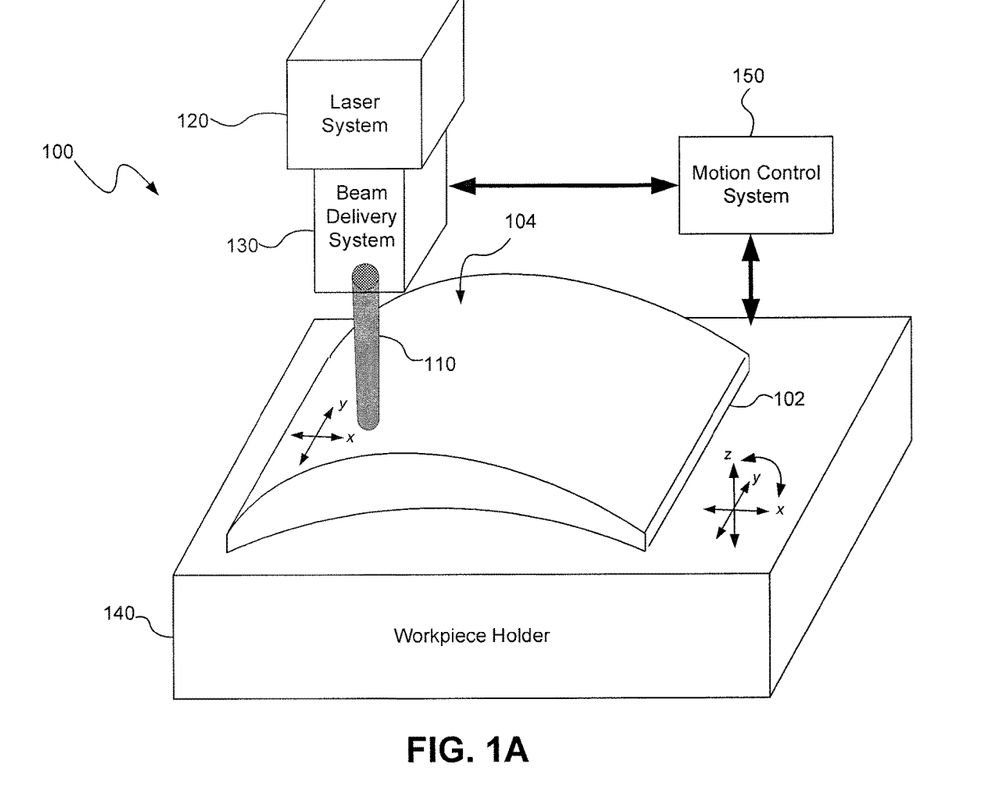
FIG. 1A is a schematic perspective view of a laser processing system and method that dithers a collimated laser beam on a three-dimensional surface of a workpiece, consistent with embodiments of the present disclosure.
Figure 1B:
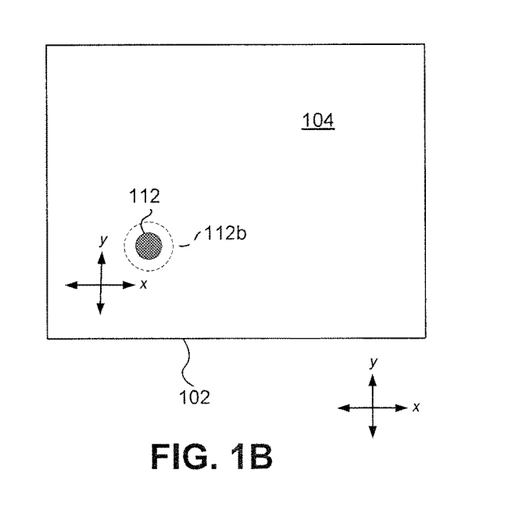
FIG. 1B is a schematic plan view of a laser beam spot on the workpiece shown in FIG. 1A.
Figure 1C:
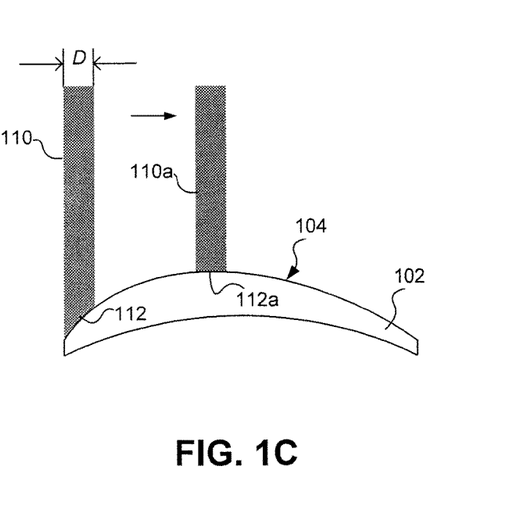
FIG. 1C is a schematic side view of a collimated laser beam moving across the workpiece shown in FIG. 1A with a consistent Z axis power density.

Referring to FIGS. 1A-1C, a laser processing method and system 100, consistent with embodiments described herein, use a collimated laser beam 110 to process a workpiece 102, for example, with a three-dimensional surface 104. The laser processing system 100 generally includes a laser system 120 that generates a laser output and a beam delivery system 130 that collimates the laser output from the laser system 120 and delivers the collimated laser beam 110 to the workpiece 102. The laser processing system 100 may also include a workpiece holder 140 capable of holding or supporting a workpiece and moving the workpiece 102 during laser processing. The workpiece holder 140 may include linear and/or rotational stages capable of moving the workpiece 102 in multiple different directions.

The collimated laser beam 110 is directed at the surface 104 of the workpiece 102, forming a beam spot 112 on the surface 104, as shown in FIG. 1B. The energy from the laser beam 110 at the beam spot 112 is used to process the surface 104 of the workpiece 102, for example, by heating the workpiece sufficiently to adhere cladding material, to weld, or to remove material. In one example, the collimated laser beam 110 has a Gaussian beam profile. The laser wavelength, the beam power, the beam power density, and the beam profile may vary and are generally dependent upon the application, the material(s) of the workpiece, and/or other materials used in the laser processing.

The collimated laser beam 110 provides a consistent Z axis power density to maintain consistent laser beam characteristics at different processing locations, for example, at different locations of the three-dimensional surface 104 contacted by the laser beam spot 112. As shown in FIG. 1C, for example, the collimated laser beam 110 with the beam spot 112 at one processing location provides substantially the same power density on the surface 104 of the workpiece 102 as a collimated laser beam 110a with a beam spot 112a at another processing location. In one example with a beam diameter of 2 mm and a power of 6 kW, the power density would be approximately 191 kW/cm$^2$. In this example, the power density of the collimated laser beam 110, 110a at both the processing location of the beam spot 112 and the processing location of the beam spot 112a should be approximately 191 kW/cm$^2$. Thus, the collimated laser beam 110 may provide a consistent Z axis power density over a relatively large working distance, thereby providing an advantage over laser processing systems that use a focused beam with a power density that changes significantly along the Z axis of the beam.

The laser system 120 may include a laser of any suitable wavelength and power to provide the desired laser processing. In particular, the laser system 120 may include a fiber laser capable of generating a laser beam with relatively high power. In one example of a laser cladding system, the laser system 120 includes an ytterbium fiber laser system capable of generating a laser beam with a 1.07 μm wavelength and an output power in the 500 W to 50 kW range, such as the YLS-3000CT available from IPG Photonics Corporation. For most applications, the laser system 120 provides a continuous wave (CW) laser output, although modulated or pulsed lasers may be used for some laser processing applications, for example, to provide a textured surface.

The collimated laser beam 110 may be dithered along the X axis or the Y axis, as indicated by the arrows, to facilitate multi-directional, multi-axis laser processing. In a laser cladding application, for example, the dithering may be used to provide a desired temperature profile on a wider region of the workpiece 104 in advance of the cladding powder being applied to the workpiece. The dithering of the collimated laser beam 110 may also be used to allow a continuous, multi-directional cladding process. In a laser welding application, the dithering may be used to facilitate welding across a region that is wider than the beam diameter. The direction, speed, and extent of the dithering may vary depending upon the application and/or the shape of the surface 104 of the workpiece 102. In one example, the dithering may be provided in a range of ±10 mm with a relatively fast response time of 10 Hz to 100 Hz. As described in greater detail below, the beam delivery system 130 may include various types of mechanisms for dithering the collimated laser beam 110.

The diameter of the collimated laser beam 110 (and thus the diameter of the beam spot 112) may also be changed, for example, for different processing applications, for different workpieces, or for different regions on a single workpiece. As shown in FIG. 1B, for example, the diameter of the collimated beam 110 may be increased to provide beam spot 112b with a larger diameter. In one example, the diameter may be changed within a range of about 2 mm to 10 mm. As described in greater detail below, the beam delivery system 130 may also include collimating optics capable of changing the diameter of the collimated laser beam 110.

The workpiece holder 140 may also be capable of moving the workpiece 102 along the X axis, the Y axis and/or the Z axis and/or rotating the workpiece 102 around any one of these axes. The laser processing system 100 further includes a motion control system 150 to control the dithering of the collimated laser beam 110 and/or the movement of the workpiece 102. The motion control system 150 may include any type of programmable motion control system (e.g., a programmed computer) used to control linear and/or rotational stages. The dithering of the collimated laser beam 110 and the movement of the workpiece 102 may be coordinated by the motion control system 150 to produce a variety of laser processing patterns (i.e., other than a straight line) on the surface 104 of the workpiece 102.

Figure 2A:
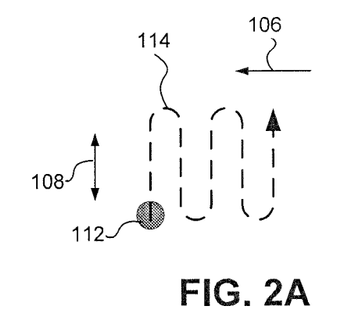
FIGS. 2A-2D illustrate examples of laser processing patterns formed by dithering a laser beam spot on a workpiece while providing a coordinated motion of the workpiece, consistent with embodiments of the present disclosure.
Figure 2B:
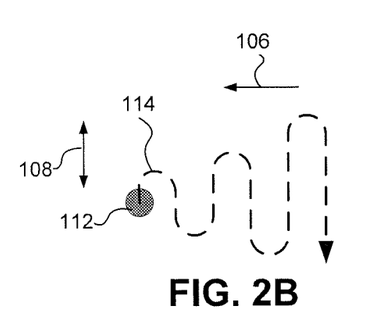

Examples of patterns that may be created by dithering the collimated laser beam 110 with a coordinated movement of the workpiece 102 are illustrated in FIGS. 2A-2D. As shown in FIG. 2A, the laser beam may be dithered to move the beam spot 112 in the direction of the arrow 108 while the workpiece is moving in the direction of the arrow 106 to form a serpentine pattern. This type of pattern may be used in a welding application, for example, to bridge the gap between two objects being welded together (e.g., thick plates being butt welded). In other words, the dithering causes the beam spot 112 to move across the gap such that the base material is pulled into the weld. FIG. 2B shows another variation of this serpentine pattern where the extent of the dither in the direction of the arrow 108 is gradually increased as the workpiece moves in the direction of the arrow 106. The extent of the dither may also be varied on other ways to create other variations of this pattern.

Figures 2C, 2D:
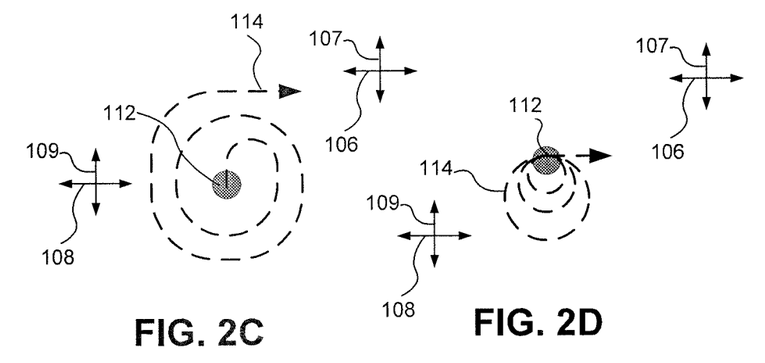

As shown in FIG. 2C, the laser beam may be dithered to move the beam spot 112 in the direction of arrow 108 or arrow 109 while moving the workpiece in the direction of arrows 106, 107 to form a spiral or swirl pattern. This type of pattern may be used in a laser cladding application, for example, to deposit a coating by starting at a center of a workpiece and working outwards. In other words, this type of pattern may advantageously be used to deposit a coating in multiple directions with a relatively continuous motion instead of using the conventional rasterizing pattern in only one direction where the system must be stopped and retraced. FIG. 2D shows another variation of a pattern of a series of circles formed by dithering the beam in the direction of arrow 108 or arrow 109 while moving the workpiece in the direction of arrows 106, 107. The dithering of the collimated laser beam thus allows patterns that dynamically provide a cladding coating on a wide range of different types of surfaces including three-dimensional surfaces.

Figure 3A:
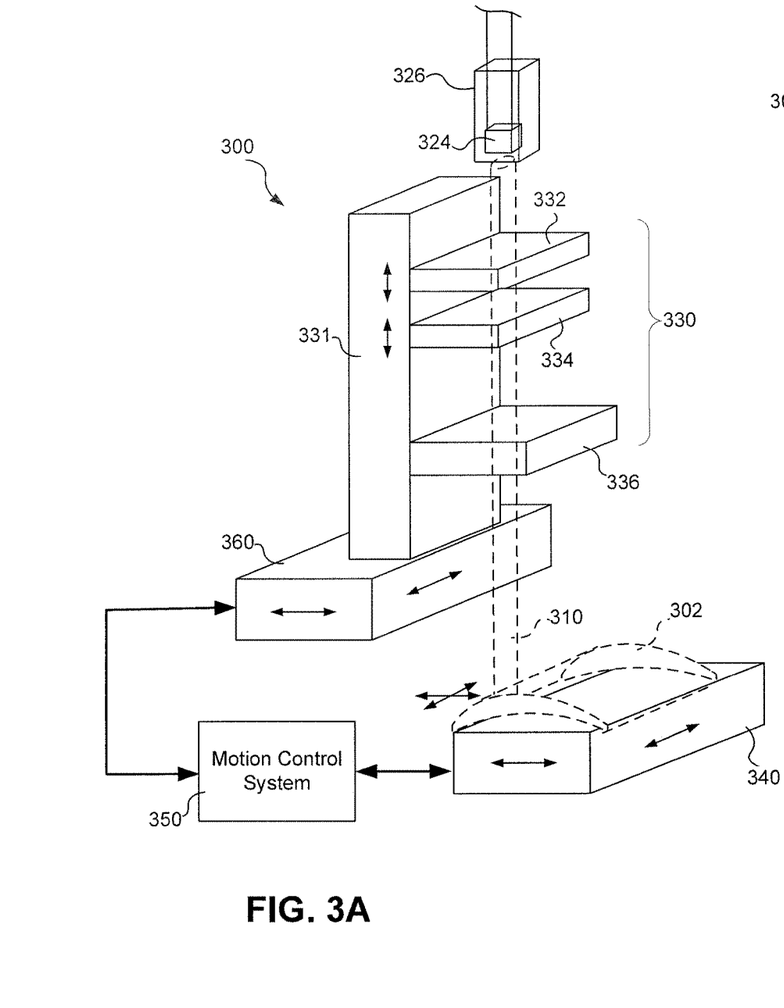
FIG. 3A is a schematic perspective view of a laser processing system including a beam delivery system for providing a collimated laser beam capable of being dithered by moving optics, consistent with some embodiments of the present disclosure.
Figure 3B:
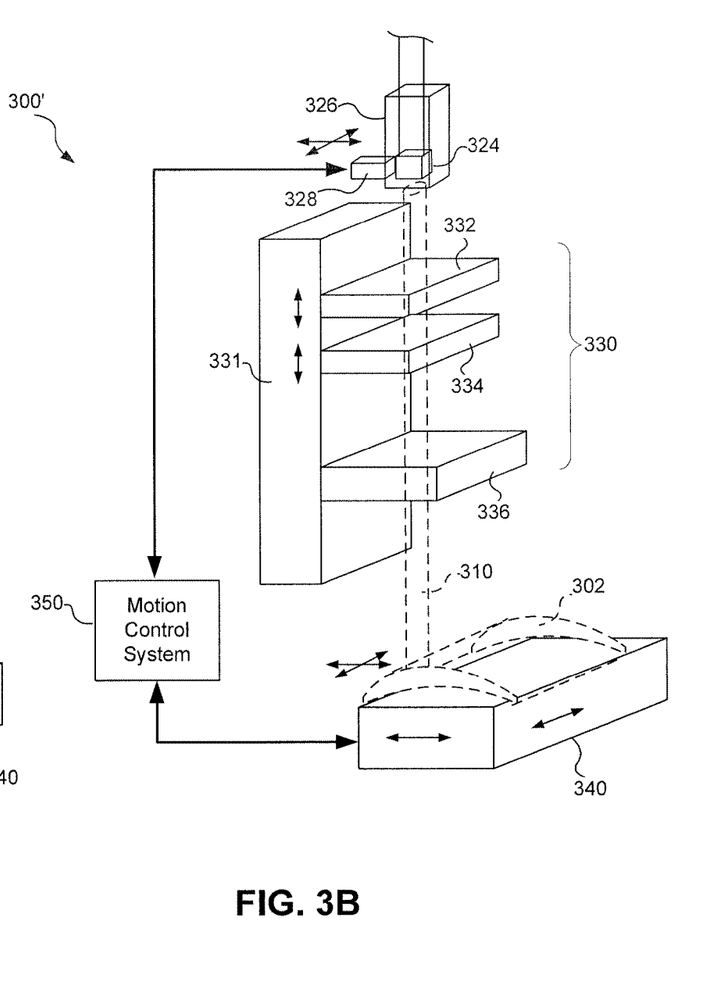
FIG. 3B is a schematic perspective view of a laser processing system including a beam delivery system for providing a collimated laser beam capable of being dithered by moving fiber laser output, consistent with other embodiments of the present disclosure.

FIGS. 3A and 3B show different embodiments of a laser processing system 300, 300' with different mechanisms for dithering an adjustable collimated laser beam 310. In both of the laser processing systems 300, 300', the beam delivery system 330 includes collimating lenses 332, 334, 336. A pair of adjustable lenses 332, 334 (e.g., as used in a telescope arrangement) provide a collimated beam 310 that may be adjustable in diameter by moving one or both of the lenses 332, 334. A final collimating lens 336 is fixed and provides the final collimation of the collimated laser beam 310. In one example, the first collimating lens 332 is adjustable in a range of about 8 mm and the second collimating lens 334 is adjustable in a range of about 40 mm to provide adjustability of the beam diameter in a range of about 2 mm to 10 mm. In one example, the first collimating lens 332 may be a convex lens and the second collimating lens 334 may be a concave lens. Other lens types capable of collimating a laser beam may also be used.

In one embodiment, shown in FIG. 3A, the adjustable collimated laser beam 310 is dithered by moving the optics of the beam delivery system 330 without moving the fiber laser output. In this embodiment, the optics of the beam delivery system 330 are moved by moving a supporting structure 331 that supports the collimating lenses 332, 334, 336. In particular, the supporting structure 331 is mounted on an optics X-Y stage 360 that provides linear movement along the X and Y axes, thereby causing the linear movement of the collimating lenses 332, 334, 336 along the X and Y axes.

A fiber laser termination block 324 is optically coupled to the beam delivery system 330 by a termination block connector 326 and is fixed such that the collimating lenses 332, 334, 336 move without moving the fiber laser output. Moving the collimating lenses 332, 334, 336 in a direction along either the X axis or Y axis relative to the fiber laser output causes the collimated laser beam 310 output from the beam delivery system 330 to move optically in an opposite direction along the respective X axis or Y axis. The optics X-Y stage 360 moves the collimating lenses 332, 334, 336, for example, within a range sufficient to move the collimated laser beam 310 within a range of ±10 mm. By moving only the optics without moving the entire head including the fiber laser output, the collimated laser beam 310 may be dithered with a relatively fast response time.

In another embodiment, shown in FIG. 3B, the adjustable collimated laser beam 310 is dithered by directly moving the fiber laser output without moving the optics. The fiber laser output may be moved directly by moving a termination block 324 that terminates a fiber laser or by moving a termination block connector 326 that connects the termination block 324 to the beam delivery system 330. In this embodiment, a fiber laser output X-Y stage 328 is coupled to either the termination block 324 or the termination block connector 326 to provide the movement that causes the dithering of the fiber laser output from the termination block 324. In one example, the termination block 324 is a quartz block and the termination block connector 326 is a quartz block holder (QBH) connector. In one example, the fiber laser output X-Y stage 328 includes one or more piezoelectric (PZT) motors or actuators. Moving the termination block 324 or the termination block connector 326 to move the fiber laser output directly may thus provide an even faster response time.

Dithering the collimated laser beam 310 by moving only the optics or by moving only the fiber laser output, as described above, also helps to maintain the collimation of the beam during processing. Thus, the consistent Z axis power density of the collimated laser beam 310 can be maintained when the laser beam is dithered during processing. Although the illustrated embodiments are capable of dithering in either the X axis or the Y axis, other embodiments may use stages that provide linear movement in only one axis.

In both embodiments, the dithering of the collimated laser beam 310 may be coordinated with the movement of a workpiece 302. In the system shown in FIG. 3A, a motion control system 350 is coupled to both a workpiece holder X-Y stage 340 and to the optics X-Y stage 360 for controlling the movement of the stages 340, 360 and coordinating the dithering of the collimated laser beam 310 with the movement of the workpiece 302. In the system shown in FIG. 3B, the motion control system 350 is coupled to both the fiber laser output X-Y stage 338 and the workpiece holder X-Y stage 340 for controlling the movement of the stages 338, 340 and coordinating the dithering of the collimated laser beam 310 with the movement of the workpiece 302.

Figure 4:
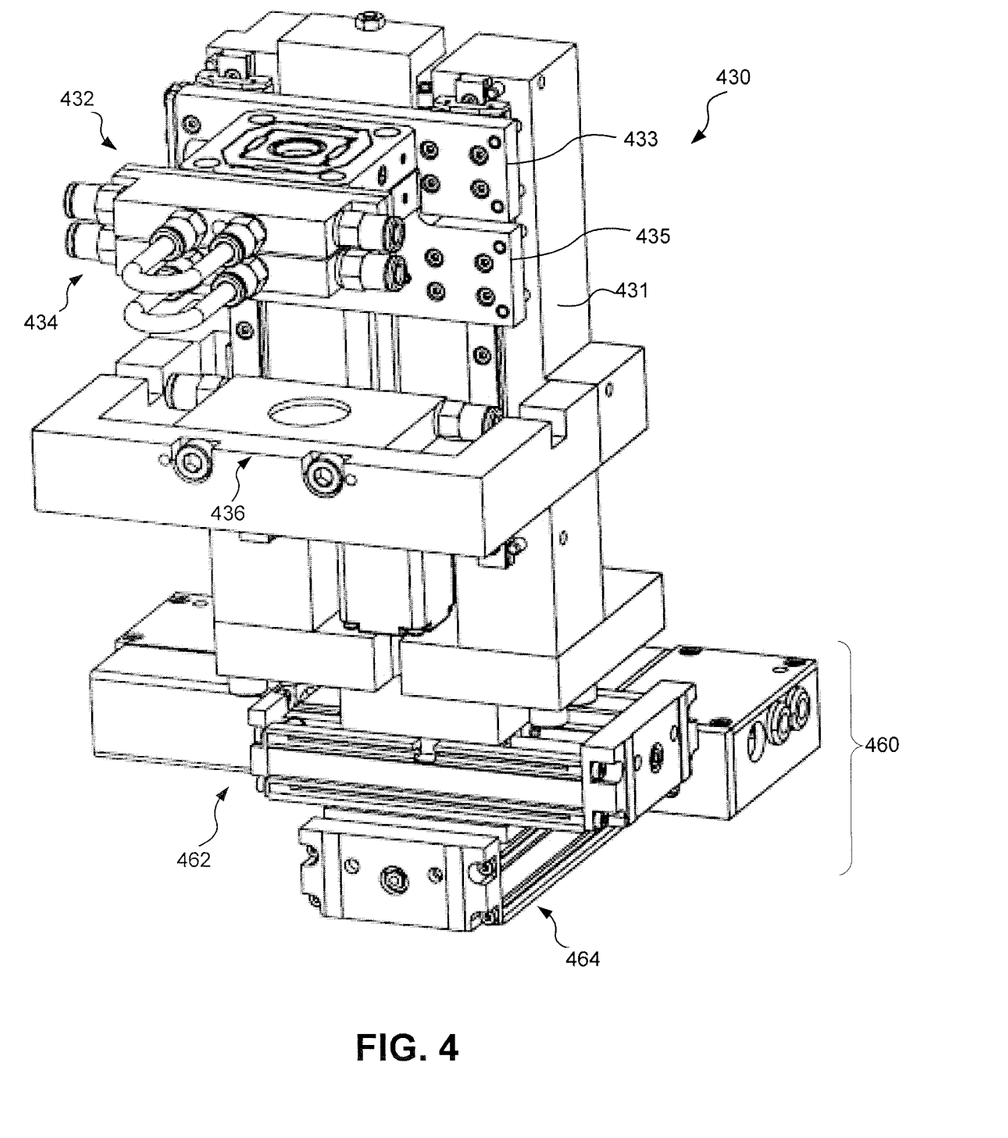
FIG. 4 is a perspective view of one embodiment of the beam delivery system for providing a collimated laser beam capable of being dithered.
Figure 5:
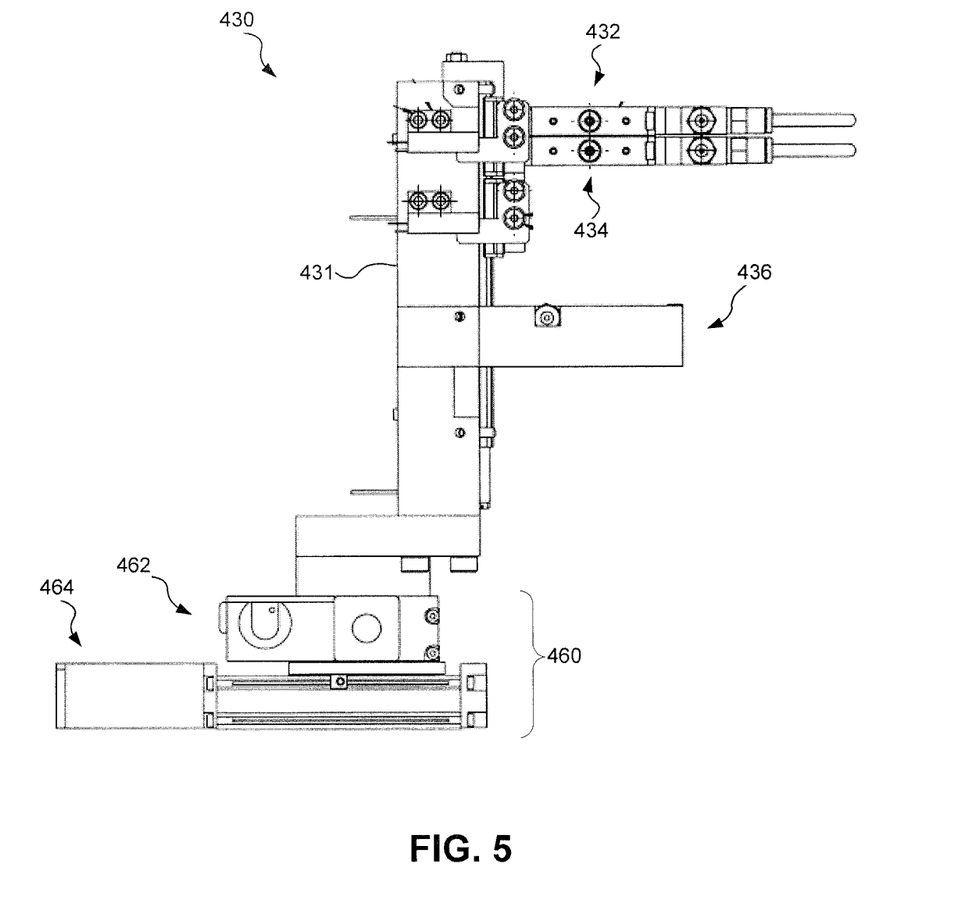
FIG. 5 is a side view of the beam delivery system shown in FIG. 4.
Figure 6:
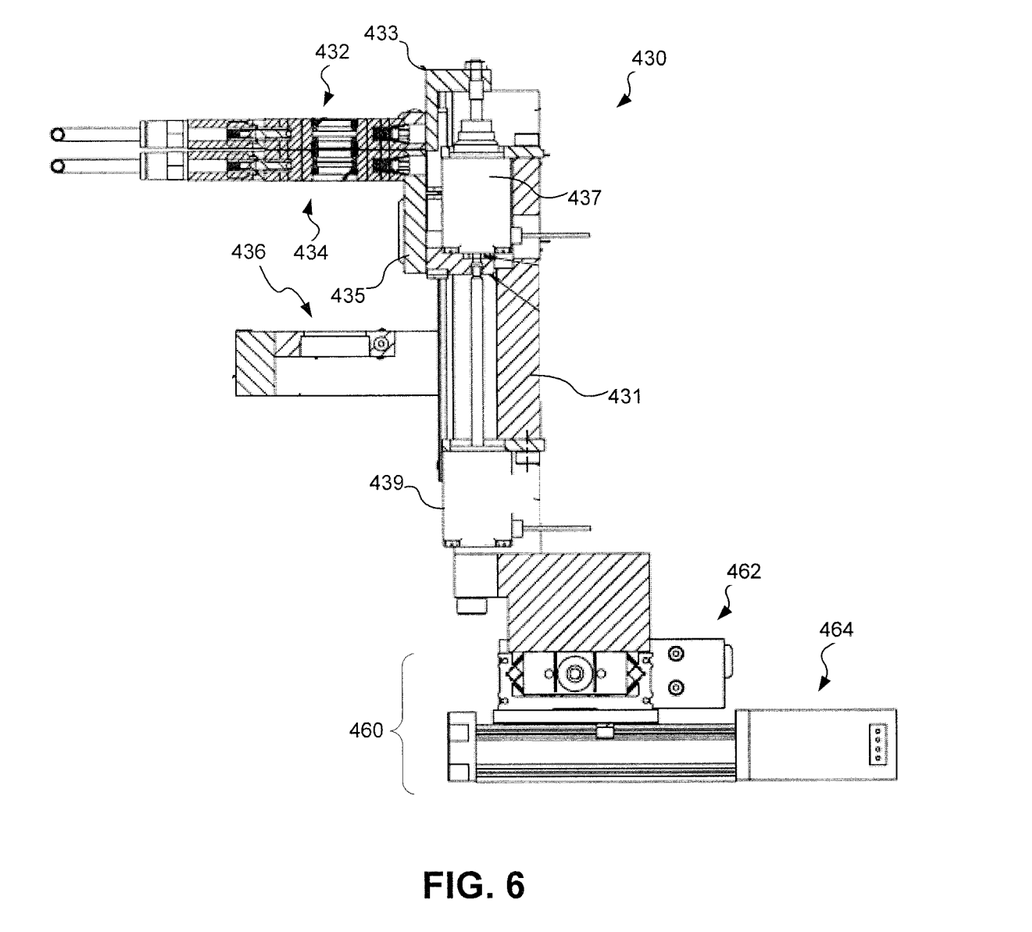
FIG. 6 is a side cross-sectional view of the beam delivery system shown in FIG. 4.

Referring to FIGS. 4-6, one embodiment of a beam delivery system 430 with movable optics is described in greater detail. The beam delivery system 430 includes a support structure 431 that supports the collimating lenses 432, 434, 436. The collimating lenses 432, 434, 436 are secured in frames and supported by the support structure 431 such that the collimating lenses 432, 434, 436 are aligned to allow the laser beam to pass through from the first collimating lens 432 to the final collimating lens 436. As illustrated in this embodiment, the first and second adjustable lenses 432, 434 may include water-cooled lenses to prevent cracking as a result of the laser energy.

The support structure 431 is supported on an X-Y linear stage 460 for movement in the X-Y directions, as discussed above. The X-Y linear stage 460 includes a first direction linear actuator 462 for providing linear motion in the X axis and a second direction linear actuator 464 for providing linear motion in the Y axis. In the illustrated embodiment, the linear actuators 462, 464 include a carriage riding on a motor driven lead screw. In other embodiments, the linear actuators may include any type of actuator capable of providing linear motion with the desired response time including, without limitation, a linear motor or a piezoelectric (PZT) motor.

The adjustable collimating lenses 432, 434 are mounted to Z axis carriages 433, 435, respectively, for movement in the Z axis. The Z axis carriages 433, 435 are slidably supported by the support structure 431 and moved in the Z axis by linear actuators 437, 439, respectively, mounted to the support structure 431 (see FIG. 6). In the illustrated embodiment, the linear actuators 437, 439 include motor driven lead screws. In other embodiments, other types of linear actuators may be used.

Figure 7:
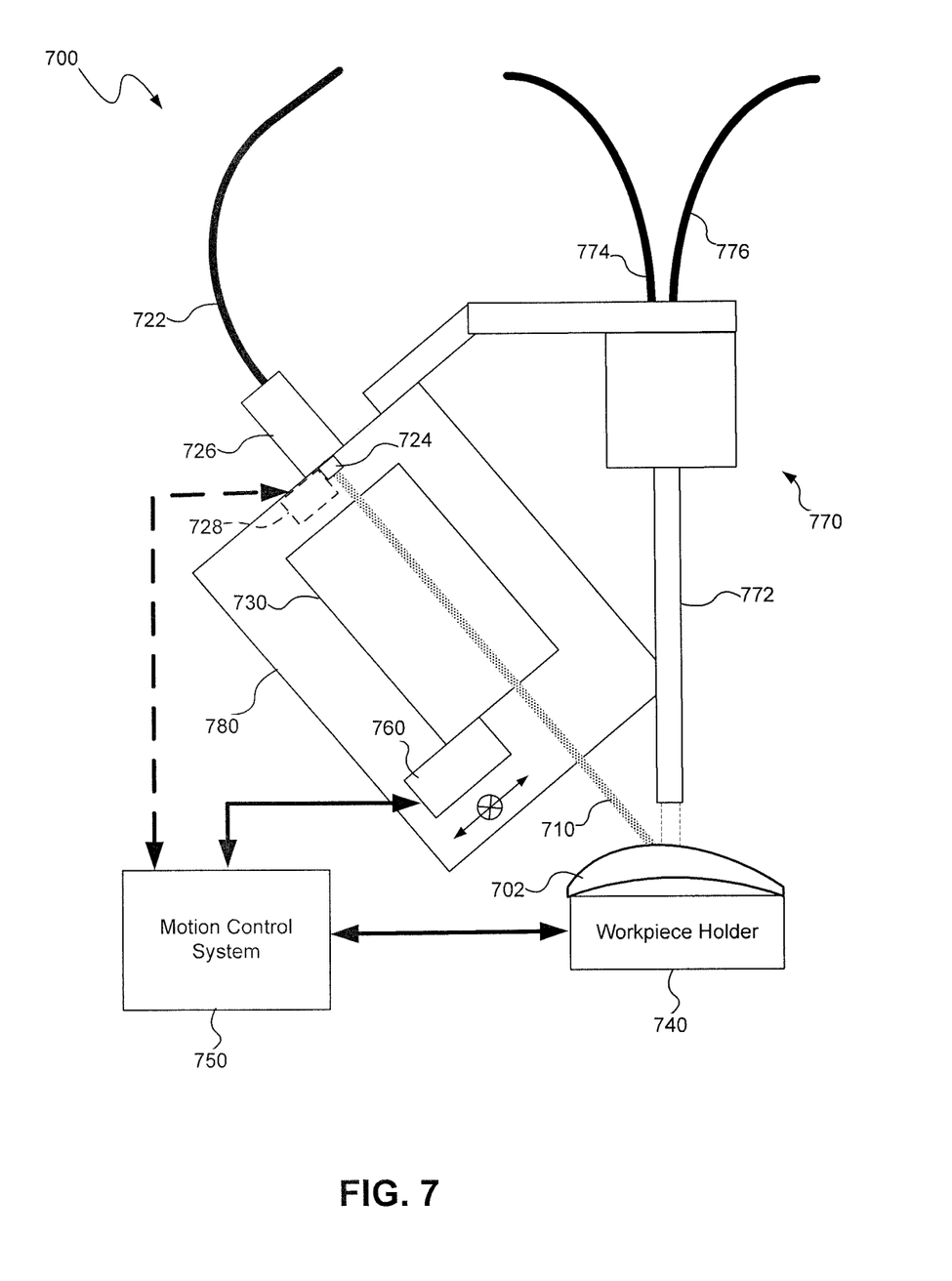
FIG. 7 is a schematic side view of a laser cladding system including a beam delivery system for providing a collimated laser beam capable of being dithered, consistent with embodiments of the present disclosure.

Referring to FIG. 7, a laser cladding system 700, consistent with embodiments of the present disclosure, is shown and described. The laser cladding system 700 includes a cladding material delivery system 770 mounted to an optical housing 780 that encloses a beam delivery system 730, for example, as described above. The output fiber 722 of a fiber laser is coupled to the optical housing 780 with a termination block connector 726 such that the fiber laser output (i.e., a fiber termination block 724) is aligned with and optically coupled to the beam delivery system 730 within the optical housing 780.

In this embodiment, the cladding material delivery system 770 includes a nozzle 772 for delivering a cladding powder material together with a high velocity gas to the workpiece, for example, as described in International Patent Application Publication Nos. WO2013/061085 and WO2013/061086, which are incorporated herein by reference. The cladding material delivery system 770 is coupled to a powder delivery line 774 and a gas delivery line 776 for supplying the cladding powder material and gas, respectively. In other embodiments, the cladding material delivery system may be configured to deliver other forms of cladding material such as wire.

The optical housing 780 also encloses an optics X-Y stage 760 for moving the beam delivery system 730 in the X axis or Y axis, as described above. Alternatively, the housing 780 may enclose a fiber laser output X-Y stage 728 for moving either the fiber termination block connector 726 or the fiber termination block 724. A motion control system 750 may control the motion of the optics X-Y stage 760 or the fiber laser output X-Y stage 728 to control the movement of the workpiece 702 in coordination with the dithering of the collimated laser beam 710, as discussed above.

In operation, the beam delivery system 730 may direct the collimated laser beam 710 to the workpiece 702 in advance of the powder material and may be dithered to provide a desired temperature profile on the workpiece 702. The collimated laser beam 710 may also be dithered on the workpiece 702 in coordination with the motion of the workpiece 702 to deposit the coating in various patterns that facilitate cladding, for example, on three-dimensional surfaces.

Referring to FIGS. 8-12, one embodiment of an integrated laser cladding optical head 800 is described in greater detail. The integrated laser cladding optical head 800 includes a cladding powder delivery system 870 mounted with a bracket 871 to an optical housing 880 enclosing a beam delivery system 830 (see FIG. 11). In this embodiment, the beam delivery system 830 includes movable optics for dithering a collimated laser beam, as shown in FIGS. 4-6 and described above. A quartz block holder (QBH) connector 826 is connected to the optical housing 880 such that a quartz block 824 is aligned with and optically coupled to the beam delivery system 830 (see FIG. 11). A sacrificial window 882 is located at an opposite end of the optical housing 880 to allow the collimated laser beam to be directed out of the optical housing 880 to a workpiece.

Figure 8:
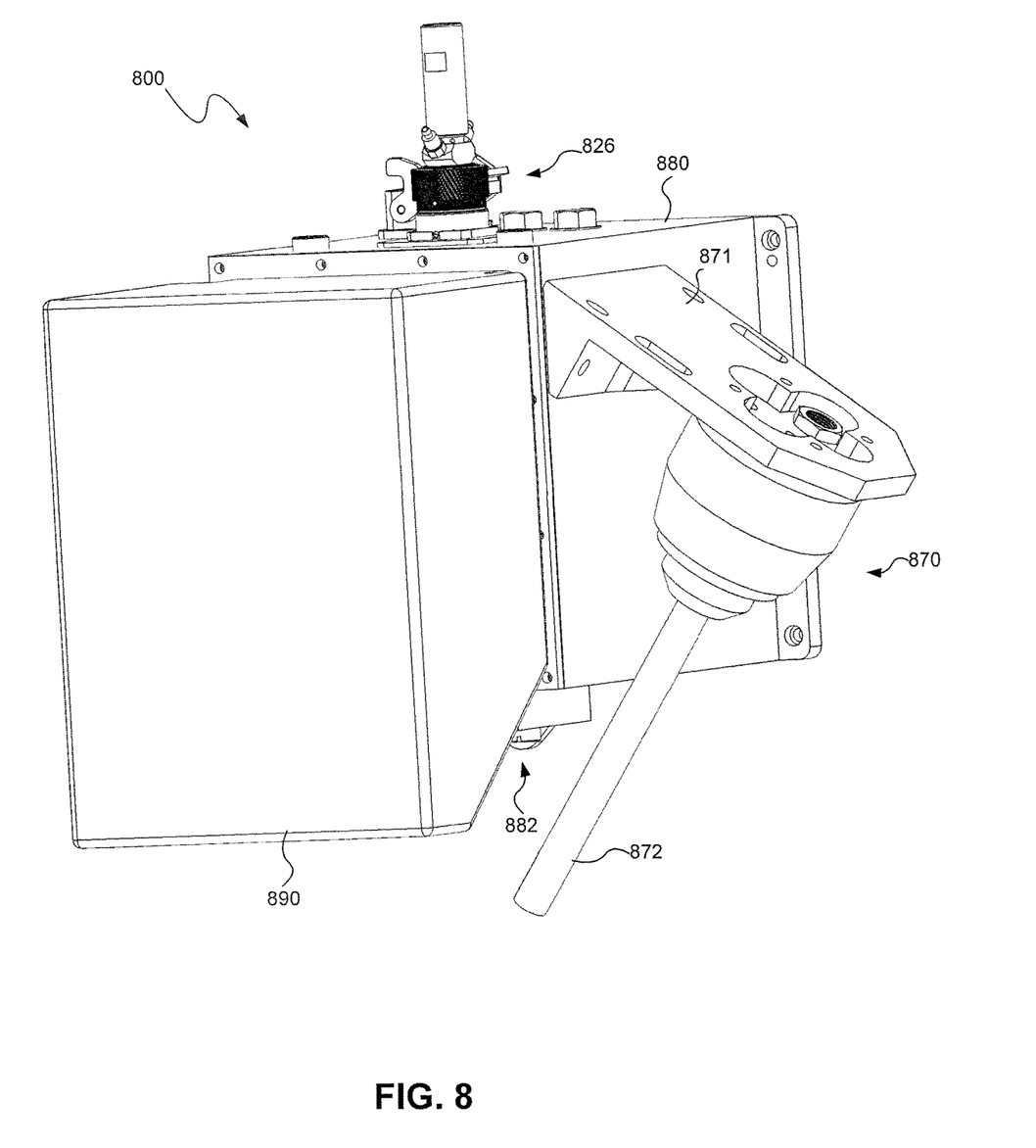
FIG. 8 is a perspective view of one embodiment of an integrated laser cladding optical head for use in a laser cladding system.
Figure 9:
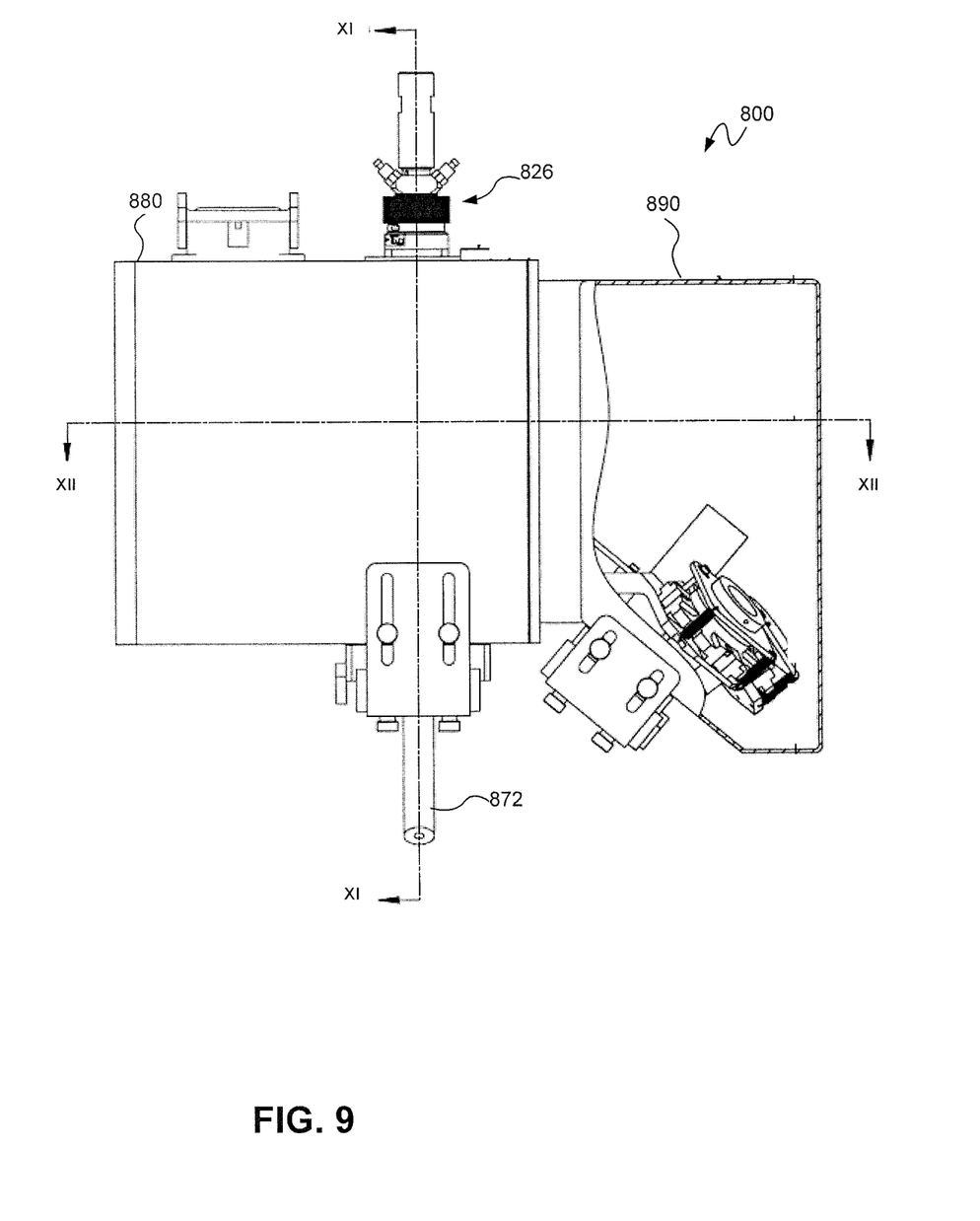
FIG. 9 is a side, partially cross-sectional view of the integrated laser cladding optical head shown in FIG. 8.
Figure 10:
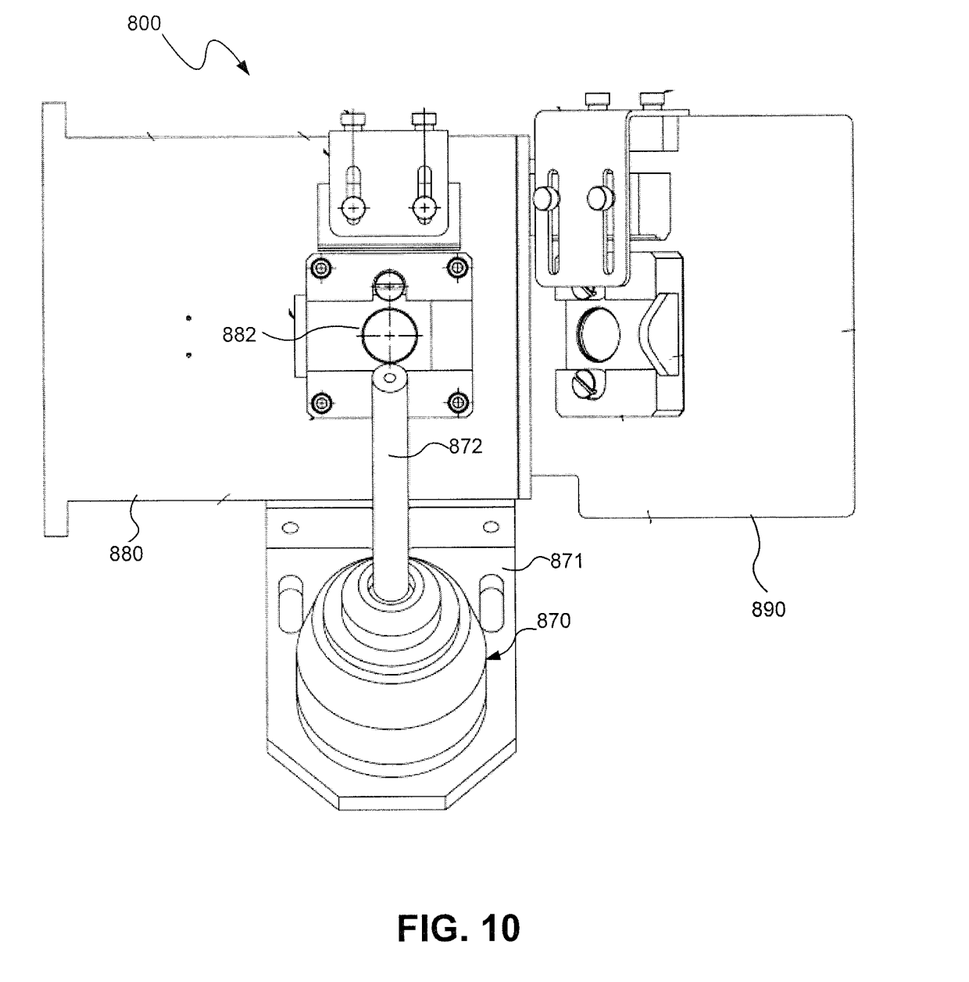
FIG. 10 is a bottom view of an integrated optical head in the integrated laser cladding optical head shown in FIG. 9.
Figure 11:
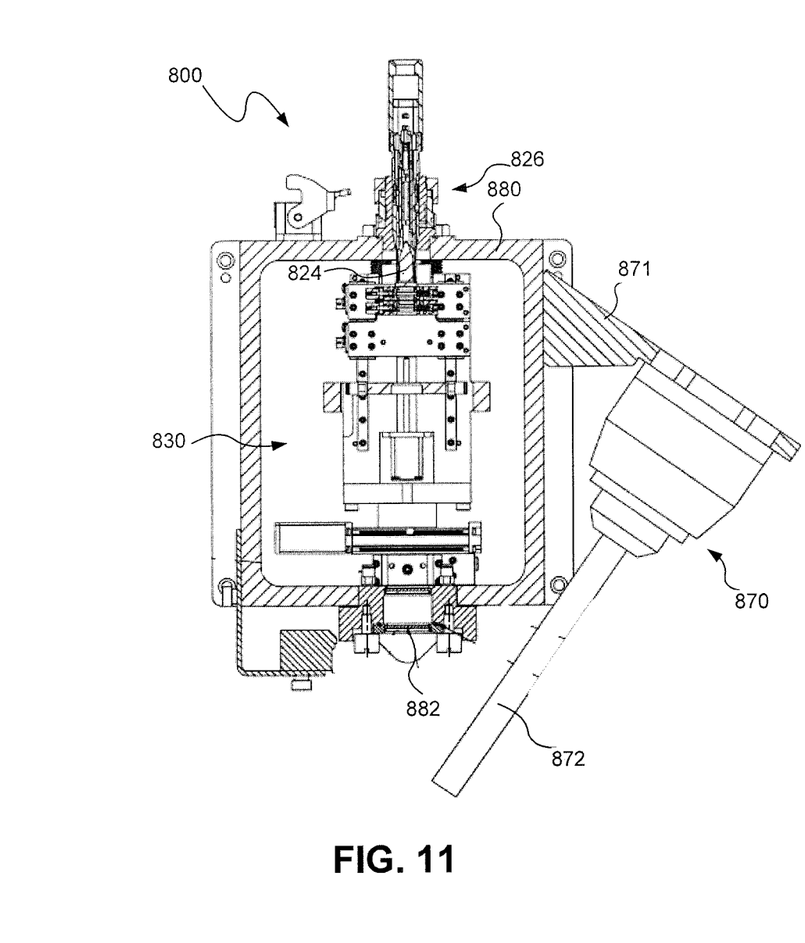
FIG. 11 is a cross-sectional view of the integrated laser cladding optical head taken along line XI-XI in FIG. 9.
Figure 12:
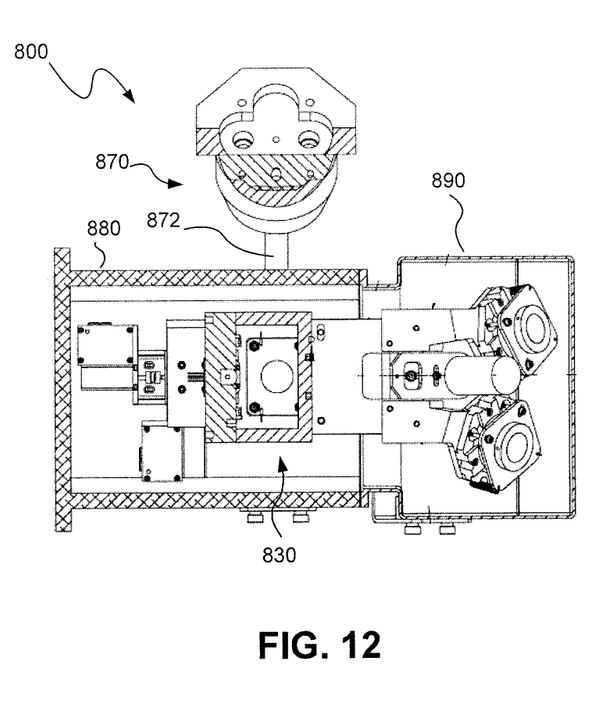
FIG. 12 is a cross-sectional view of the integrated laser cladding optical head taken along line XII-XII in FIG. 9.

The cladding powder delivery system 870 includes a nozzle 872 for delivering the cladding powder material together with a heated gas at a high velocity. Although the nozzle 872 position is fixed relative to the optical housing 880, the dithering of the collimated laser beam provided by the beam delivery system 830 allows the laser beam to be moved relative to the powder impinging the workpiece.

In this embodiment, a monitoring system housing 890 is also mounted to the optical housing 880. The monitoring system housing 890 encloses monitoring systems for monitoring the cladding processing, such as a pyrometer for monitoring the temperature of the processing region.

Figure 13:
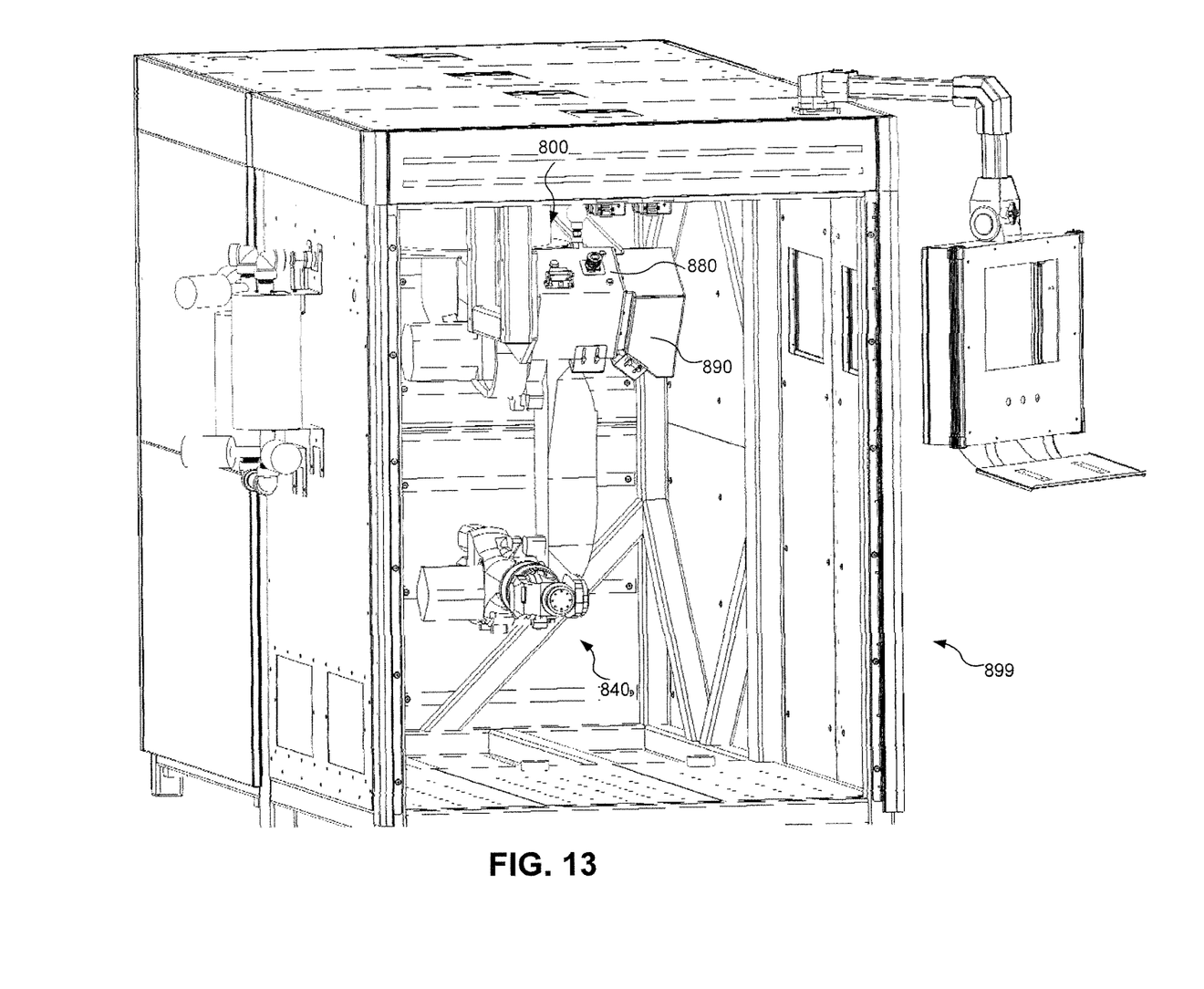
FIG. 13 is a perspective view of an embodiment of a laser cladding system including the integrated laser cladding optical head shown in FIGS. 8-12 mounted within an enclosure together with a workpiece holder.

As shown in FIG. 13, the integrated laser cladding optical head 800 may be mounted within an enclosure 899 relative to a workpiece holder 840 that supports and moves a workpiece. In the illustrated embodiment, the workpiece holder 840 is a robotic arm capable of rotating the workpiece and moving the workpiece in X, Y and Z axes. Thus, the integrated laser cladding optical head 800 remains fixed while the workpiece is moved by the workpiece holder 840 and/or the collimated laser beam is dithered within the optical housing 880.

Accordingly, laser processing systems and methods, consistent with embodiments described herein, are capable of processing more complex three-dimensional surfaces by dithering the laser beam while maintaining consistent laser beam characteristics at processing locations.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for laser processing a workpiece, the method comprising:
generating a laser beam from a fiber laser and collimating the laser beam by passing the laser beam through collimating optics to provide a collimated laser beam defining a Z axis along a length of the collimated laser beam, the collimated laser beam having a consistent Z axis power density along at least a portion of the length of the collimated laser beam;
directing the collimated laser beam toward the workpiece to form a beam spot on a surface of the workpiece, wherein the workpiece has a three-dimensional surface, and wherein the collimated laser beam provides the consistent Z axis power density at different processing locations on the three-dimensional surface;
moving the workpiece such that the beam spot facilitates processing on the surface of the workpiece as the workpiece moves; and
dithering the collimated laser beam along at least one of X and Y axes perpendicular to the Z axis defined by the collimated laser beam such that the beam spot is dithered on the workpiece as the workpiece is moved, wherein dithering the collimated laser beam includes moving a fiber laser output without moving the collimating optics of a beam delivery system optically coupled to the fiber laser output to provide relative movement along at least one of the X and Y axes between the collimating optics and the fiber laser output, wherein dithering is performed within a range of ±10 mm, and wherein the collimated laser beam has the consistent Z axis power density along a working range along the Z axis of at least 300 mm.

2. The method of claim 1 wherein the collimating optics include at least two collimating lenses, and wherein generating the collimated laser beam includes passing a laser output through the at least two collimating lenses.

3. The method of claim 2 wherein at least one of the collimating lenses is movable in the Z axis to change a diameter of the beam spot on the workpiece.

4. The method of claim 1 wherein processing includes cladding.

5. The method of claim 1 wherein processing includes welding.

6. The method of claim 1 wherein processing includes surface cleaning.

7. The method of claim 1 wherein the workpiece is a turbine blade.

8. The method of claim 1 wherein the workpiece is a valve seat.

9. The method of claim 1 wherein dithering the collimated laser beam further comprises coordination with movement of the workpiece such that the beam spot moves in a continuous pattern on the surface of the workpiece.

10. The method of claim 9 wherein the pattern is a serpentine pattern.

11. The method of claim 9 wherein the pattern is a spiral pattern.

12. The method of claim 1 wherein dithering is performed with a frequency of 10 Hz to 100 Hz.

13. A laser cladding method for depositing a cladding layer on a workpiece having a three-dimensional surface, the method comprising:
 generating a laser beam from a fiber laser and collimating the laser beam by passing the laser beam through collimating optics to provide a collimated laser beam defining a Z axis along a length of the collimated beam, the collimated laser beam having a consistent Z axis power density along at least a portion of a length of the collimated laser beam;
 directing the collimated laser beam toward the workpiece to provide a beam spot on a surface of the workpiece;
 dithering the collimated laser beam along at least one of X and Y axes perpendicular to the Z axis defined by the collimated laser beam such that the beam spot is dithered on the workpiece as the workpiece is moved, wherein dithering the collimated laser beam includes moving a fiber laser output without moving the collimating optics, wherein dithering is performed within a range of ±10 mm;
 directing a cladding material toward the workpiece such that the cladding material impinges the surface of the workpiece on a region heated by the beam spot, wherein the collimated laser beam is directed to the surface of the workpiece in advance of the cladding material, and wherein the collimated laser beam provides the consistent Z axis power density at different processing locations on the three-dimensional surface of the workpiece to provide a consistent temperature profile on the surface of the workpiece in advance of the cladding material, wherein the collimated laser beam has the consistent Z axis power density along a working range along the Z axis of at least 300 mm; and
 moving the workpiece such that the cladding material forms a cladding layer on the surface of the workpiece as the workpiece moves.

14. The laser cladding method of claim 13 wherein the workpiece is a turbine blade.

15. The laser cladding method of claim 13 wherein the collimating optics include at least two collimating lenses, and wherein generating the collimated laser beam includes passing a laser output through the at least two collimating lenses.

16. The laser cladding method of claim 15 wherein at least one of the collimating lenses is movable in the Z axis to change a diameter of the beam spot on the workpiece.

17. The laser cladding method of claim 13 wherein dithering the collimated laser beam further comprises coordination with movement of the workpiece such that the beam spot moves in a continuous pattern on the surface of the workpiece.

18. The laser cladding method of claim 17 wherein the pattern is a spiral pattern.

19. The laser cladding method of claim 13 wherein the cladding material is powder entrained in a stream of gas.

20. The laser cladding method of claim 13 wherein dithering is performed with a frequency of 10 Hz to 100 Hz.

* * * * *